United States Patent [19]

Blum

[11] Patent Number: 4,882,408

[45] Date of Patent: Nov. 21, 1989

[54] ONE-COMPONENT POLYURETHANE SYSTEMS CONTAINING VISCOSITY-REGULATING SUBSTANCES

[75] Inventor: Rainer Blum, Ludwigshafen, Fed. Rep. of Germany

[73] Assignee: BASF Aktiengesellschaft, Ludwigshafen, Fed. Rep. of Germany

[21] Appl. No.: 217,609

[22] Filed: Jul. 11, 1988

[30] Foreign Application Priority Data

Jul. 24, 1987 [DE] Fed. Rep. of Germany ....... 3724555

[51] Int. Cl.$^4$ .............................................. C08G 18/30
[52] U.S. Cl. .................................. 528/49; 428/423.1; 428/425.8; 525/457; 525/458; 528/61; 528/68
[58] Field of Search ............................ 528/49, 61, 68; 428/423.1, 425.8; 525/457, 458

Primary Examiner—Maurice J. Welsh
Attorney, Agent, or Firm—Keil & Weinkauf

[57] ABSTRACT

One-component polyurethane systems contain reaction products prepared in situ from
 (A) monoamines and/or polyamines and/or polymeric substances having one or more amino groups and
 (B) mono- and/or polyisocyanates and/or polymeric substances having one or more isocyanate groups
as viscosity-regulating substances.

9 Claims, No Drawings

ONE-COMPONENT POLYURETHANE SYSTEMS CONTAINING VISCOSITY-REGULATING SUBSTANCES

Recently, a number of one-component polyurethane systems have been disclosed, whose common feature is that the starting materials which react with one another to form the ready-to-use polyurethane systems are present in dispersions comprising separate phases and stabilized with stabilizers. These dispersions have a long shelf life or a retarded reactivity. As a result of heating, catalysis or strong shearing, the stabilization is eliminated and the reactive starting materials react with one another with formation of the required polyurethane plastics.

By choosing the starting materials from polyisocyanates and substances which are reactive toward those polyisocyanates, such one-component stabilized polyurethane systems can be tailored to a wide range of applications, for example for pressure-sensitive adhesives, hard coatings, in particular on metals, adhesive materials, antidrumming compounds, joint sealing compounds and underbody protection materials in automotive construction, shaped finished and semifinished products of unreinforced or reinforced and foamed polyurethane materials and many other applications.

Such one-component polyurethane system are described in, for example; German Patent Nos. 3,112,054, 3,261,670, 3,228,670, 3,228,724, 3,228,723, 3,325,735, 3,343,125, 3,343,124, 3,131,780, 3,230,757, 3,347,247, 3,403,497, 3,403,499, 3,403,500, 3,418,429 and 3,418,430. The polyurethane systems mentioned in the stated Patents do not form a subject of the present invention but are the starting systems in which the viscosity-regulating reaction products of (A) monamines and/or polyamines and/or polymeric substances having one or more amino groups and (B) monoisocyanates and/or polyisocyanates and/or polymeric substances having one or more isocyanate groups are prepared in situ.

One-component polyurethanes are intended for a wide range of uses, for example for the production of films and molding and for coatings as well as for the formation of sound-insulating and anticorrosion and stone chip-resistant coatings on metals, for example for air conditioning ducts and metal doors. Other very important uses are as metal adhesives, for joint sealing and as underbody protection for motor vehicles, as well as for the product of pressure-sensitive adhesives.

Most applications have in common the fact that the materials are processed to give relatively thick layers by methods such as those known for the distribution of liquids, for example by centrifugal casting for the production of moldings, by knife-coating or brushing on fleeces for the production of imitation leather, and by airless spraying to form the underbody protection coatings on automobiles.

For these applications, it is desirable in many cases to obtain a certain viscous behaviour of the one-component polyurethane systems, in particular, for example, very pronounced structurally viscous to thixotropic flow behaviour, which results in these systems being easily distributed under the shear stress during application but building up a high viscosity very rapidly in the rest state after application.

Conventional methods for adjusting the viscous behaviour of plastic dispersions or solutions consist in the addition of, for example, organic and/or inorganic fillers, highly swelling, high molecular weight substances of synthetic or natural origin, such a partially crosslinked polyacrylic acid, partially crosslinked or, in particular, high molecular weight polyacrylamide, modified cellulose, vegetable or animal glues and swelling agents, eg. gelatine or gum arabic, montmorillonites modified with organic substances, or finely divided amorphous silica prepared by flame hydrolysis, soaps of polyvalent metals, such as aluminum oleate or calcium ricinoleate, etc.

The one-component polyurethane systems are very sensitive combination of starting components forming the required polyurethane plastics, ie. polyisocyanate and substances which are capable of reacting with polyisocyanate and which as a rule are polyfunctional, for example polyester polyols, polyether polyols, polyamines, polyamides, plymercaptans or polycarboxylic acids, and stabilizers which result in stable phase separation, as well as assistants which are necessary and effective for the isocyanate reaction, in particular catalysts.

In an attempt to adjust the viscosity of the one-component polyurethane system with the additives described above, above a number of difficulties are encountered.

Many of these substances are capable of reacting with polyisocyanates and increase the isocyanate requirement or interfere with the ratio of the number of equivalents in a manner which is difficult to control.

Others are not readily incorporated into the polyurethane matrix, are exuded and have an adverse effect on the mechanical properties and on the decorative surface which is desired in many cases.

A serious obstacle to the use of substances having a particularly large surface area, such as amorphous silica or silica formulations, is the observation that the action of many catalysts is adversely affected or eliminated in the presence of these substances, possibly by adsorption.

It is an object of the present invention to provide a viscosity-regulating, thickening, thixotropic principle which imparts structural viscosity and does not have the abovementioned disadvantages.

We have found that this object is achieved by one-component polyurethane systems containing reaction products prepared in situ from (A) monoamines and/or polyamines and/or polymeric substances having one or more amino groups and (B) mono- and/or polyisocyanates and/or polymeric substances having one or more isocyanate groups as viscosity-regulating substances.

The resulting reaction products produce an extremely high degree of thickening, which increases under shear stress and decreases again after the end of shearing. The effect can be varied within a wide range by the choice of the substances (A) and (B) and the amounts of additives, in relation to the thickening effect, the dependence of the viscosity on the shear rate (structural viscosity) and the duration of shearing (thixotropic effect).

Another advantage is that the resulting reaction products are compatible with the polyurethane plastics and are also incorporated by chemical reactions at the relatively high temperatures generally used in convertng the one-component polyurethane systems into the required polyurethane plastics, and do not interfere with the reactions or adversely affect the properties of the end products.

The components are used in a ratio such that the viscosity-regulating substances formed are free of isocyanate groups.

In an advantageous embodiment, a monoamine is reacted with a polyisocyanate or a monoisocyanate.

In another embodiment, the monoamine can furthermore be reacted with a mixture of a monoisocyanate and a polyisocyanate.

In a further embodiment, a monoamine, together with a polyamino compound, is reacted with a polyisocyanate.

However, it may also be advantageous to react a mixture of a monoamine and a polyamino compound with a monoisocyanate or a polyisocyanate or with a mixture of a monoisocyanate and polyisocyanate.

In another advantageous embodiment, a polyamino compound is reacted with a monoisocyanate. However, it may also be advantageous to react the polyamino compound with a mixture of monoisocyanate and a polyisocyanate.

Regarding the individual reaction components, the following may be stated:

Particularly suitable monoamines are straightchain or branched aliphatic monoamines having saturated or unsaturated groups, for example N-n-alkenylamines, N-n-alkylamines or N-sec-alkylamines. Other suitable compounds are cycloaliphatic amines and hydroxymonoamines. Examples of suitable monoamines are benzylamines, cyclohexylamine, ethylamine, n-propylamine, isopropylamine, n-butylamine, sec-butylamine, tert-butylamine, n-pentylamine, α-methylbutylamine, ethylpropylamine, β-ethylbutylamine and methylbutylamine. Aliphatic and araliphatic monoamines having 1 to 4 aliphatic carbon atoms, such as benzylamine, propylamine and tert-butylamine, are preferably used. Suitable hydroxyamines are monohydroxyamines, such as 2-aminoethanol, 1-aminoethanol, 2-aminopropanol, 3-aminopropanol, 1-amino-2-propanol or 2-amino-2-pentanol, and polyhydroxymonoamines, such as 2-aminomethyl-1,3-propanediol and 2-amino-2-ethyl-1,3-propanediol. Alternatively, mixtures of one or more monoamines and one or more monohydroxyamines and/or polyhydroxymonoamines may be used.

Suitable polyamino compounds are organic compounds which contain more than one amino group capable of reacting with isocyanate groups. Examples of polyamino compounds of this type are those having primary or secondary amino groups, such as polyethyleneimine, hexamethylenediamine, 1,2-propylenediamine or tetrapropylenepentamine, preferably high molecular weight polyamidoamines, as are obtainable, for example, by reacting dicarboxylic acids, such as dimerized fatty acids, with an excess of polyvalent amines and have amine numbers of from 80 to 500, preferably from 200 to 420, and viscosities of from 1 to 80 mPa.s.

A typical compound of this type has, for example, an amine number of 360 and a viscosity of about 32 mPa.s.

Other suitable compounds are hydrazines and hydrazides, eg. adipic dihydrazide.

Polyisocyanates which are suitable for the reaction with the monoamines and polyamino compounds are diand polyisocyanates, such as aliphatic, cycloaliphatic, araliphatic, aromatic and heterocyclic polyisocyanates, eg. ethylene diisocyanate, 1,4-tetramethylene diisocyanate, 1,6-hexamethylene diisocyanate, 1,12-dodecane diisocyanate, cyclobutane 1,3-diisocyanate, cyclohexane, 1,3- and 1,4-diisocyanate and any mixtures of these isomers, 1-isocyanato-3,3,5-trimethyl-5-isocyanatomethylcyclohexane (German Published Application DAS 1,202,785), 2,4- and 2,6-hexahydrotoluylene diisocyanate and any mixtures of these isomers, hexahydro-1,3- and/or -1,4-phenylene diisocyanate, perhydrodiphenylmethane-2,4- and/or -4,4'-diisocyanate, 1,3- and 1,4-phenylene diisocyanate, 2,4- and 2,6-toluylene diisocyanate and any mixtures of these isomers, diphenylmethane 2,4'- and/or 4,4'-diisocyanate, naphthylene, 1,5-diisocyanate, triphenylamine 4,4',4"-triisocyanate, polyphenylenepolymethylene polyisocyanates (obtained by aniline/formaldehyde condensation followed by phosgenation as described in Brtitish Patent Nos. 874,430 and 848,671), perchlorinated aryl polyisocyanates (cf. German Published Application No. DAS 1,157,601), carbodiimide-containing polyisocyanates (cf. German Patent No. 1,092,007), diisocyanates according to U.S. Patent No. 3,492,330, allophanate-containing polyisocyanates (cf. British Patent No. 994,890 and Belgian Patent No. 761,626), polyisocyanates containing isocyanurate groups (cf. German Patent Nos. 1,002,789, 1,222,067 and 1,027,394 and German Laid-Open Application Nos. DOS 1,929,034 and DOS 2,004,048), polyisocyanates containing urethane groups (cf. Belgian Patent No. 752,261 and U.S. Pat. No. 3,394,164), acrylated polyisocyanates containing urea groups (cf. German Patent No. 1,230,778), polyisocyanates containing biuret groups (cf. German Patent No. 1,101,394 and British Patent No. 889,050), polyisocyanates prepared by telomerization reactions (cf. Belgian Patent No. 723,640), polyisocyanates containing ester groups (cf. British Patent Nos. 956,474 and 1,072,956, U.S. Pat. No. 3,567,763 and German Patent No. 1,231,668) or reaction products of the abovementioned isocyanates with acetals (cf. German Patent No. 1,072,385).

For the purposes of the present invention, monoisocyanate compounds are aliphatic, aromatic and/or cycloaliphatic monoisocyanates. The aliphatic monoisocyanates may have, for example, up to 25 carbon atoms. Both here and in the case of the aromatic and cycloaliphatic monoisocyanates, industrially readily obtainable and economical compounds are particularly preferred. Examples are alkyl isocyanates, such as ethyl isocyanate, propyl isocyanate, n-butyl isocyanate or stearyl isocyanate, secondary alkyl isocyanates, such as tert-butyl isocyanate, and/or aromatic isocyanates, such as phenyl isocyanate, 1-naphthyl isocyanate, toluyl isocyanates or toluenesulfonyl isocyanate, and cycloaliphatic isocyanates, such as cyclohexyl isocyanate.

The monoamines or polyamino compounds are reacted with the mono- and/or polyisocyanates in proportions such that there are one or more amino groups capable of reacting with isocyanates groups per isocyanate group. Reaction products in which from 5 to 100 equivalent % of the amino groups of the monoamines or of the polyamio compound have been reacted with the isocyanates groups of the mono- or polyisocyanate are preferred.

The novel reaction products are used in an amount of from 0.01 to 30, preferably from 0.1 to 0.5, % by weight, based on the total weight of the one-component polyurethane systems.

Two preparation process have proven advantageous, namely the in situ preparation, ie. direct preparation in the ready-prepared or partially prepared one-component polyurethane system or in some of the liquid phase by successively stirring in (A) and (B) or (B) and (A), the viscosity-regulating reaction products being formed immediately by spontaneous chemical reaction due to the high reaction rate of isocyanate with amine, and the thickening effect occurring immediately.

It is also possible to prepare very highly thickened part batches and to obtain the desired viscous behavior by mixing with unthickened materials.

The one-component polyurethane systems are suitable for a wide range of uses, for example for the production of films and moldings, for coatings and for the formation of sound-insulating and anticorrosion and stone chip-resistant coatings on metals, for example for air conditioning ducts and metal doors. Other very important uses are as metal adhesives, as joint sealants and as underbody protection for motor vehicles and for the production of pressure sensitive adhesives.

COMPARATIVE EXAMPLE 1

(Primer according to European Patent No. 100 507, having a low solvent content)

90 g of a polyesterdiol based on propylene oxide and having a molecular weight of about 450, 140 g of a polyethertriol based on glycerol and propylene oxide and having a molecular weight of about 450, 45 g of $TiO_2$ pigment white, 47.5 g of chalk powder and 2.5 g of iron oxide black were dispersed in a cooled dissolver at from 30° to 35° C. and then cooled to about 20° C., and 122 g of finely powdered 2,4-toluylene diisocyanate dimerized via uretdione bonding were dispersed therein. 2.8 g of polyamidoamine based on dimerized linoleic fatty acid, having an amine number of about 400, were dispersed therein at about 20° C. 114 g of xylene and 0.2 g of phenylmercury acetate were also stirred in.

A material which was capable of being sprayed with conventional spray guns and, after 20 minutes at 140° C., gave a gray coating having good mechanical properties was obtained.

On vertical surfaces, the coating exhibited runs at dry film thicknesses >60 μm and, on prolonged standing, the coating materials formed sediments which were difficult to stir up.

EXAMPLE 1

The procedure described in Comparative Example 1 was followed, except that subsequently 0.8 g of diphenylmethane diisocyanate (crude MDI) was also stirred in, followed immediately by 0.63 g of benzylamine.

The coating material could be sprayed to give run-free coats up to a dry film thickness of about 90 μm and formed only a small amount of sediment on standing.

COMPARATIVE EXAMPLE 2

(Underbody protection compound for automobiles, according to European Patent No. 100,507)

140 g of polyethertriol based on a glycerol and propylene oxide and having a molecular weight of about 420, 300 g of a polyetherdiol based on propylene oxide and having a molecular weight of about 1,000, 50 g of chalk powder, 10 g of titanium white (anatase) and 5 g of iron oxide yellow were dispersed in a cooled dissolver at from 30° to 40° C. The dispersion was cooled to about 20° C. and 136 g of finely powdered toluylene diisocyanate dimerized via uretdione bonds were dispersed therein, after which 2.2 g of polyamidoamine (as in Example 1) were dispersed therein and 3 g of a 33% strength by weight solution of diazabiscyclooctane in butylglycol were stirred in.

The resulting material could be applied to the underneath of automobile bodies using a high pressure atomizer under about 200 bar. After heat treatment for 20 minutes at 140° C., a fine-foamed underbody protection for automobiles was formed.

In areas under particular stress, for example the wheel arches, a particularly thick coat of up to about 7 mm is desirable; this was impossible with the material since it ran off in the baking furnace above about 3 mm.

EXAMPLE 2

The procedure described in Comparative Example 2 was followed, except that subsequently 5.31 g of isopropylamine were stirred in, followed by 12.15 g of unpurified diphenylamethane diisocyanates (crude MDI). The mixture exhibited structural viscosity immediately.

The material nevertheless remained readily sprayable under the high shearing of the spray system and was stable in coats up to about 20 mm.

I claim:

1. A mixture which contains, in a major amount, a one-component polyurethane system and, in an amount of 0.01 to 30 percent by weight based on the total weight of the one-component polyurethane system, a thixotropic and viscosity-regulating substance which is the reaction product prepared in the presence of the one-component polyurethane system of reactants
   (A) monoamines and/or polyamines and/or polymeric substances having one or more amino groups and
   (B) mono- and/or polyisocyanates and/or polymeric substances having one or more isocyanate groups, wherein reactants (A) and (B) are reacted in a ratio such that there are one or more amino groups, per isocyanate group present, capable of reacting with the isocyanate groups and that all the isocyanate groups are reacted and 5–100% of the amino groups are reacted.

2. A mixture as defined in claim 1 wherein the one-component polyurethane system is based on a stabilized dispersion of isocyanates in substances which are capable of reacting with isocyanate.

3. A mixture as defined in claim 1, wherein the one-component polyurethane system is based on a stabilized dispersion of polyamines having retarded reactivity, in combination with free isocyanates and/or isocyanates having retarded reactivity.

4. A coating on a metal article which may or may not have been pretreated, obtainable using a mixture as defined in claim 1.

5. An adhesive, a sealing compound or an antidrumming compound for metal articles, obtainable using a mixture as defined in claim 1.

6. An underbody protection material for motor vehicles, obtainable using a mixture as defined in claim 1.

7. An unreinforced or reinforced engineering polyurethane, film or molding, obtainable using a mixture as defined in claim 1.

8. A pressure-sensitive adhesive or a molding, film or sheet-like fibrous structure coated therewith, obtainable using a mixture as defined in claim 1.

9. A mixture as defined in claim 1, wherein the thixotropic and viscosity-regulating substance is present in an amount of 0.1 to 0.5% by weight based on the total weight of the one-component polyurethane system.

* * * * *

UNITED STATES PATENT AND TRADEMARK OFFICE
CERTIFICATE OF CORRECTION

PATENT NO. : 4,882,408

DATED : November 21, 1989

INVENTOR(S) : BLUM

It is certified that error appears in the above-identified patent and that said Letters Patent is hereby corrected as shown below:

Title page:

In the References Cited

Please list the following:

-- U. S. Patent Documents

| | | |
|---|---|---|
| 4,400,497 | 8/83 | Blum et al. |
| 4,383,068 | 5/83 | Brandt |
| 3,893,956 | 7/75 | Brandt-- |

Signed and Sealed this

Thirtieth Day of October, 1990

Attest:

HARRY F. MANBECK, JR.

*Attesting Officer*  *Commissioner of Patents and Trademarks*